(12) United States Patent
Mullis et al.

(10) Patent No.: US 9,791,339 B2
(45) Date of Patent: Oct. 17, 2017

(54) METHOD AND DEVICE FOR MEASURING A VACUUM PRESSURE USING A MEASURING CELL ARRANGEMENT

(71) Applicant: INFICON GMBH, Bad Ragaz (CH)

(72) Inventors: Felix Mullis, Flums (CH); Martin Wuest, Malans (CH)

(73) Assignee: INFICON AG, Balzers (LI)

( * ) Notice: Subject to any disclaimer, the term of this patent is extended or adjusted under 35 U.S.C. 154(b) by 134 days.

(21) Appl. No.: 14/654,771

(22) PCT Filed: Nov. 20, 2013

(86) PCT No.: PCT/EP2013/074313
§ 371 (c)(1),
(2) Date: Jun. 22, 2015

(87) PCT Pub. No.: WO2014/102035
PCT Pub. Date: Jul. 3, 2014

(65) Prior Publication Data
US 2015/0346044 A1 Dec. 3, 2015

(30) Foreign Application Priority Data

Dec. 24, 2012 (CH) ...................................... 2938/12

(51) Int. Cl.
*G01L 9/00* (2006.01)
*G01L 9/12* (2006.01)
(Continued)

(52) U.S. Cl.
CPC .......... *G01L 9/0072* (2013.01); *G01L 9/0045* (2013.01); *G01L 9/0075* (2013.01);
(Continued)

(58) Field of Classification Search
CPC .................................................. G01L 9/0072
See application file for complete search history.

(56) References Cited

U.S. PATENT DOCUMENTS 5,969,258 A * 10/1999 Gerst ...................... G01L 9/125
361/283.4
5,992,240 A  11/1999 Tsuruoka
(Continued)

FOREIGN PATENT DOCUMENTS

DE         3912219 A1  10/1989
DE    102009002662 A1  10/2010
(Continued)

OTHER PUBLICATIONS

International Search Report for PCT/EP2013/074313 filed Nov. 20, 2013.
(Continued)

*Primary Examiner* — Ryan Walsh
(74) *Attorney, Agent, or Firm* — Notaro, Michalos & Zaccaria P.C.

(57) ABSTRACT

Arrangement with capacitive pressure-measuring cell has a diaphragm for measuring vacuum pressure and a printed circuit board acting as a temperature sensor and another electronic component designed as a microchip that contains a digital signal processor with a temperature-to-digital converter and a capacitance-to-digital converter using a time measuring method. The converters determine temperature and capacitance of the cell in comparison to a reference resistor for temperature arranged on the printed circuit board and reference capacitor for capacitance for the pressure to be measured dependent on deformation of the diaphragm. A temperature-corrected pressure signal derived from the two measured signals uses correlation, the measured signals having been determined in advance from a calibration process, and the temperature-corrected pressure signal is provided as a pressure signal at the signal output for further processing. In this manner there is quick pressure measurement with high measuring accuracy.

20 Claims, 6 Drawing Sheets

(51) Int. Cl.
*G01L 13/02* (2006.01)
*G01L 21/00* (2006.01)

(52) U.S. Cl.
CPC ............ *G01L 9/125* (2013.01); *G01L 13/025* (2013.01); *G01L 21/00* (2013.01)

(56) References Cited

U.S. PATENT DOCUMENTS 7,484,416 B1    2/2009  Klosinski
2008/0110269 A1*  5/2008  Strietzel ............... G01L 9/0075
                                                            73/718

FOREIGN PATENT DOCUMENTS

| EP | 0524550 A1 | 1/1993 |
| EP | 1174696 A2 | 1/2002 |
| WO | 97/27802 A1 | 8/1997 |
| WO | 2010/049794 A1 | 5/2010 |

OTHER PUBLICATIONS

International Patentability Report and Written Opinion for PCT/EP2013/074313 filed Nov. 20, 2013.

* cited by examiner

METHOD AND DEVICE FOR MEASURING A VACUUM PRESSURE USING A MEASURING CELL ARRANGEMENT

BACKGROUND OF THE INVENTION

The invention relates to a method for measuring a pressure using a measuring cell arrangement according to the preamble of patent claim 1, as well as to an arrangement for this purpose according to claim 18.

It is known to measure pressures and pressure differences by pressurizing a thin diaphragm and measuring the resulting deflection. A known and suitable method for measuring the deflection of such diaphragms is to design the diaphragm arrangement as variable electric capacitance, wherein via an electronic measuring equipment the capacitance change is evaluated in a known manner, the said capacitance change correlating with the pressure change. The capacitance is formed by positioning the thin, deflectable diaphragm surface slightly spaced to another surface of a body and the two opposing surfaces are formed electrically conductive. When the diaphragm and the body are made of electrically non-conductive, dielectric material, the surfaces are, for example, coated with an electric coating forming the capacitor electrodes. The diaphragm and/or the body themselves can be made of electrically conductive material, wherein the surfaces again form the capacitor electrodes. By pressurizing the diaphragm, the distance between the two electrodes changes due to the deflection, providing an evaluable capacitance change of the arrangement. Sensors of this kind are produced in large quantities, e.g., from silicon. Both, the plane base body and the diaphragm are often completely made of silicon material in this connection. There are also embodiments having combined material compositions, e.g., silicon with a glass base. Thus, the sensors can be produced cost-efficiently. Pressure sensors of this kind are normally only applicable for higher pressure ranges in the range of approximately $10^{-1}$ mbar up to several bar. High resolution and lower pressures than $10^{-1}$ mbar are not feasible anymore with the material silicon. Sensors of this type are not suitable for typical vacuum applications. For the different vacuum processes to be controlled, measurements of pressures in vacuum are often carried out between atmospheric pressure and $10^{-6}$ mbar. Such measurements require a high sensitivity with a high resolution and reproducibility of the vacuum pressure measurement, what only specially designed measuring cells are capable of, which differ completely from the setup of the high pressure-measuring cells.

Capacitive diaphragm pressure-measuring cells being made of corrosion-resistant material, such as $Al_2O_3$, are particularly suitable for the vacuum pressure measurement. In EP 1 070 239 B1 (being an integral part of the present application), a capacitive vacuum measuring cell is described, which is substantially built completely of ceramic and is thus corrosion-resistant to a large extent. To be able to measure very low pressures down to $10^{-6}$ mbar with a high accuracy, a very thin ceramic diaphragm of a thickness of, e.g., <250 µm is used, which is arranged tensionless and symmetrically inside a ceramic housing. The distance between the capacitor electrodes or between the diaphragm surface and the surface of the housing body, respectively, preferably lies in the range of 2 to 50 µm. The diameters of such diaphragm pressure-measuring cells preferably lie in the range of 5 to 80 mm. The capacitances formed thereby and to be measured for such diaphragm pressure-measuring cells lie in the range of 10 pF to 32 pF. In this connection, the measured capacitive serves as measure for the pressure to be measured. Said capacitance changes according to the pressure dependent deflection of the diaphragm, whereby the pressure being present at the diaphragm can be identified. The capacitance measurement needs to be carried out very precisely and is not entirely easy for such small capacitance values. According to the present state of the art, small interference-prone capacitances are usually digitalized using a sigma-delta capacitance-to-digital converter (CDC). The electronics assembly being necessary for this purpose is arranged on a small printed circuit board behind the diaphragm pressure-measuring cell and connected via a line with the capacitor electrodes of the measuring cell. The digitalized signal is processed and calibrated afterwards within another electronics assembly, which comprises a microprocessor and is arranged on another printed circuit board. Consequently, such a measuring cell arrangement for measuring vacuum comprises a capacitive diaphragm pressure-measuring cell and an electronics assembly for signal processing arranged thereto. Said measuring cell arrangement is connected in the usual manner with the vacuum components to be measured, such as vacuum containers or vacuum pipelines, which contain the gaseous media to be measured.

The measurement of small capacitances is diversely used for reading out the values to be measured of sensors. However, the precise measurement of such small capacitances is not entirely easy. In Baxter's book (Larry K. Baxter, Capacitive Sensors, IEEE Press, NJ 1997) a multitude of possible circuitries is shown. Predominantly, said circuitries were designed such that an as linear as possible correlation to the measurand arises, such that the measurement signal can directly be processed analogously.

The circuitries did not change fundamentally till now, only the opportunity of integration created several interesting additional solutions. For instance, Analog Device has combined a charge weighing machine with a delta-sigma converter within their CDC series of integrated circuitries and developed a very powerful microchip, such as the microchip being named AD7745. A great advantage of said integrated solution is the possibility to be able to reduce problems with the temperature compensation and enable a better shielding of a large part of the critical elements inside the chip housing.

A further option to measure capacitances is to measure the charging time of a capacitor, what in principle can be realized relatively easy. In this connection, the capacitor to be measured is usually charged with a current, e.g., via a constant current source or via a charging resistor. The voltage, the current, and the time needed for the charging are measured and the capacitance is determined therefrom. For small capacitances problems arise in this connection with the measurement of very small currents and the very short measuring times. Capacitances can also be measured in a bridge circuit based on Wheatstone. A popular example for this is the measuring-circuit in which a diode array is used as rectifier. In such a circuitry an amplitude-stabilized sinus source is used. Said sinus sources can be, for instance, an amplitude-stabilized Wien oscillator. Additionally, the comparatively large temperature coefficients of the rectifiers need to be taken into account in this connection. Such a circuitry concept leads to a complex circuit technology.

Capacitive diaphragm pressure-measuring cells are used in vacuum processes for the exact pressure determination. Such vacuum processes comprise a wide variety of processes, such as coating processes, etching processes, thermal treating of workpieces etc. These processes are often operated using supporting gases, which are needed within the process, both, active as reactive gas or also as inert gas. In this connection, the vacuum system is supplied with the gases via a pressure control system or flow control system, respectively. In this case, a capacitive diaphragm pressure-measuring cell can serve as pressure sensor for the control system. For a precise process control it is necessary that the diaphragm pressure-measuring cell measures as precisely as possible, but, in particular, measures fast, too.

Another important application of such diaphragm pressure-measuring cells is also the calibration of high vacuum pressure-measuring cells of a wide variety of designs, such as Pirani type, Penning type, diaphragm pressure-measuring cells etc. In this case, a diaphragm pressure-measuring cell can serve as reference pressure-measuring cell for the comparison with the measuring cells to be calibrated, for example, by means of comparison measurements. An important popular method became also known as static expansion method, which is described more detailed in the book "Wutz, Handbuch Vakuumtechnik" (10. Auflage, Karl Jousten (Hrsg.), Vieweg+Teubner, Wiesbaden 2010, ISBN 978-3-8348-0695-6).

For the application of the capacitive diaphragm pressure-measuring cell as reference pressure-measuring cell in calibration devices, besides the measurement accuracy, in particular, a high measuring speed is also important to be able to record the effective actual pressure values during pressure changes with an accuracy as high as possible. The temperature influences on the measuring accuracy of the reference pressure-measuring cell are also important and need to be controlled as good as possible.

The diaphragm pressure-measuring cell arrangements known by now are slow concerning this matter and the measuring times are larger than 8 ms or even larger than 30 ms. The achievable measuring accuracy of 0.15% to 0.4% of the measured value is often insufficient, too, especially for larger temperature ranges of 5 to 220° C. The measurement range to be measured or the measurable capacitance of the diaphragm pressure-measuring cell, respectively, is limited by the use of known microchips for the measurement electronics (e.g., 21 pF for AD7745). This fact limits the production scope or dramatically minimizes the corresponding yield, respectively, and thus increases the production costs.

SUMMARY OF THE INVENTION

Therefore, the objective of the present invention is to eliminate the disadvantages of the state of the art. In particular, the present invention sets the task to increase the measuring speed of the diaphragm pressure-measuring cell arrangement significantly. The measuring accuracy and the reproducibility, as well as the stability of the measuring cell, shall be improved, in particular regarding the temperature behavior of the diaphragm pressure-measuring cell arrangement. Moreover, the measuring cell arrangement shall be economically producible.

The problem according to the invention is solved both by the method for measuring a vacuum pressure using a measuring cell arrangement according to claim 1 and by a measuring cell arrangement according to claim 18. The dependent patent claims relate to further advantageous embodiments of the invention.

The method according to the invention for measuring a vacuum pressure using a measuring cell arrangement comprises a capacitive diaphragm pressure-measuring cell for measuring vacuum using a diaphragm as a pressure transducer, wherein a first housing body is arranged at one side of the diaphragm spaced to the diaphragm sealing up at the edge region using a joining means such that a reference vacuum space is formed in between and that on the other side of the diaphragm spaced to the diaphragm another housing body is arranged sealing up at the edge region using a joining means such that a measuring vacuum space is formed in between and that the second housing body comprises an opening at which connecting means are arranged sealing up using joining means for a communicating connection of the measuring vacuum space with the medium to be measured, wherein inside the reference vacuum space at least one part at least of the surface of the diaphragm and located at the opposite at least one part at least of the surface of the first housing body are designed electrically conductive and form capacitor electrodes for the formation of an electric capacitance ($C_x$) and that the measuring cell arrangement comprises a printed circuit board (10) which is equipped with electronic components and at least one of said electronic components acts as a temperature sensor, wherein the printed circuit board is electrically connected with the capacitor electrodes of the diaphragm pressure-measuring cell, wherein the printed circuit board is positioned relative to the diaphragm pressure-measuring cell such that the component that acts as a temperature sensor thermally contacts the first housing body via a heat transfer zone and that another electronic component is designed as microchip containing a digital signal processor (DSP) with a temperature-to-digital converter (TDC) and a capacitance-to-digital converter (CDC), which operates using the time measuring method, said temperature-to-digital converter and said capacitance-to-digital converter determine the temperature ($T_x$) and the capacitance ($C_x$) of the diaphragm pressure-measuring cell in comparison to a reference resistor ($R_{ref}$) for the temperature being arranged at the printed circuit board and a reference capacitor ($C_{ref}$) for the capacitance ($C_x$) forming the measure for the pressure to be measured dependent on the deformation of the diaphragm, wherein a temperature-corrected pressure signal is derived from the two measured signals using correlation means, which have been determined in advance from a calibration process, and said temperature-corrected pressure signal is provided as a pressure signal $p=f(C_x, T_{eff})$ at the signal output for further processing.

The values determined for the temperature correction and/or the pressure signal via calibration can be stored as a table in a memory but also as a mathematical function $T_{eff}=f(T_x)$ and/or $P_{eff}=f(C_x)$. The use of the mathematical function, in particular for the pressure signal, is preferred. Wherein it is particularly advantageous to use the mathematical function for both, the values for the temperature correction and the determination of the pressure signal. In this calibration process for the determination of the actual pressure signal, the correction values of the determined temperature deviation are, in addition to the pressure signal, superimposed such that said pressure signal is corrected over the pressure range to be measured and over the respective temperature range, to which the diaphragm measuring cell is exposed. The calibration process is individually carried out for each single measuring cell and the determined values for the temperature correction and the adjusted pressure signal are stored in the memory of the electronics assembly belonging to the diaphragm pressure-measuring cell. Said electronics assembly is attached directly behind the diaphragm pressure-measuring cell and arranged on a printed circuit board. A microchip is located on this printed circuit board, carrying out the whole signal processing including the capacitance measurement. Furthermore, on the printed circuit board both a reference capacitor ($C_{ref}$) is arranged and connected with the microchip for the capacitance measurement and a reference resistor ($R_{ref}$) is arranged and connected with the microchip for temperature measurement. A separate temperature sensor can be designed for measuring the temperature at the diaphragm pressure-measuring cell. Said sensor is arranged such that it thermally contacts the diaphragm pressure-measuring cell. However, it is particularly advantageous to work without said temperature sensor and to use the microchip, besides all its other functions, as temperature sensor itself and to position said microchip such that it is in contact with the diaphragm pressure-measuring cell. This enables a particularly precise temperature measurement.

The diaphragm and the first housing body can completely or partially be made of an electrically conductive material, such as a metal. However, it is clearly preferred to make said diaphragm and first housing body at least in parts, preferably in total, out of a dielectric material. For this purpose, aluminum oxide is particularly suitable. In this case, the electrodes are attached as electrically conductive layer to the surface of the diaphragm and to the surface of the oppositely located first housing body. In this connection, it is also advantageous when the second housing body is also made of the same material as the first housing body and said housing bodies are designed plate-shaped, for instance, disc-shaped. The diaphragm pressure-measuring cell should also be constructed as symmetrically as possible.

By the use of such a method for measuring a vacuum pressure, significantly faster measuring times or cycle times, respectively, lying below 8 ms, in particular below 1 ms and even up to 500 µs, can be achieved.

The measurable capacitance range is significantly extended and lies now in the range of 0.1 pF to 50 pF and even of 0.1 pF to 1000 pF (1 nF) or even above.

The improvement of the temperature compensation and linearization can be improved such that errors below 0.1% F.S. (full scale) can be achieved over a large temperature range, such as −40° C. to 450° C., too.

The requirements for the measuring cell arrangement are substantially simplified for the practical application or the handling regarding pressure and temperature, respectively.

A fast identification of the vacuum pressure is very advantageous for many pressure measuring applications and allows more precise process controls.

For instance, the measuring cell arrangement can be used advantageously as reference measuring cell arrangement for the calibration of vacuum measuring cells, in particular according to the method of statistic expansion. In this connection, it is important that the measurements of the pressure values to be compared for the calibration process can be carried out as simultaneously as possible, whereby a higher calibration accuracy is achieved.

The pressure measurement in vacuum process systems is a particularly important field of application. In these systems, pressure measuring cells are used for process monitoring, as well as in pressure control systems. The fast pressure determination of the process pressure is very important for pressure control systems to achieve precise results in the process. In this connection, typical processes are coating processes, etching processes, thermal vacuum treatments etc. On the one hand, the total pressure of the vacuum needs to be determined and on the other hand, in addition, suitable process gases are often used or introduced, respectively, which are appropriately used for the process control. Besides inert gases, such as argon, reactive gases being converted during the process, are also used in such processes, in particular in plasma processes, but also in CVD processes (Chemical Vapor Deposition) and others. In this connection, the participating reactive gases are consumed in a way and even integrated in the final product, e.g., in a coating. By a fast determination of the gas pressure of the participating gases using the pressure measuring cell according to the present invention, gas control systems for vacuum processes can be realized which allow achieving substantially more precise results, such as more precise compositions of deposited layers or more precise etching structures. When doing so, the waste of gas can also be reduced and costs can be saved. This application is particularly important for the semiconductor industry.

BRIEF DESCRIPTION OF THE SEVERAL VIEWS OF THE DRAWINGS

The invention is schematically and exemplarily described by means of figures now.

It is shown in.

DETAILED DESCRIPTION OF THE INVENTION

Figure 1:
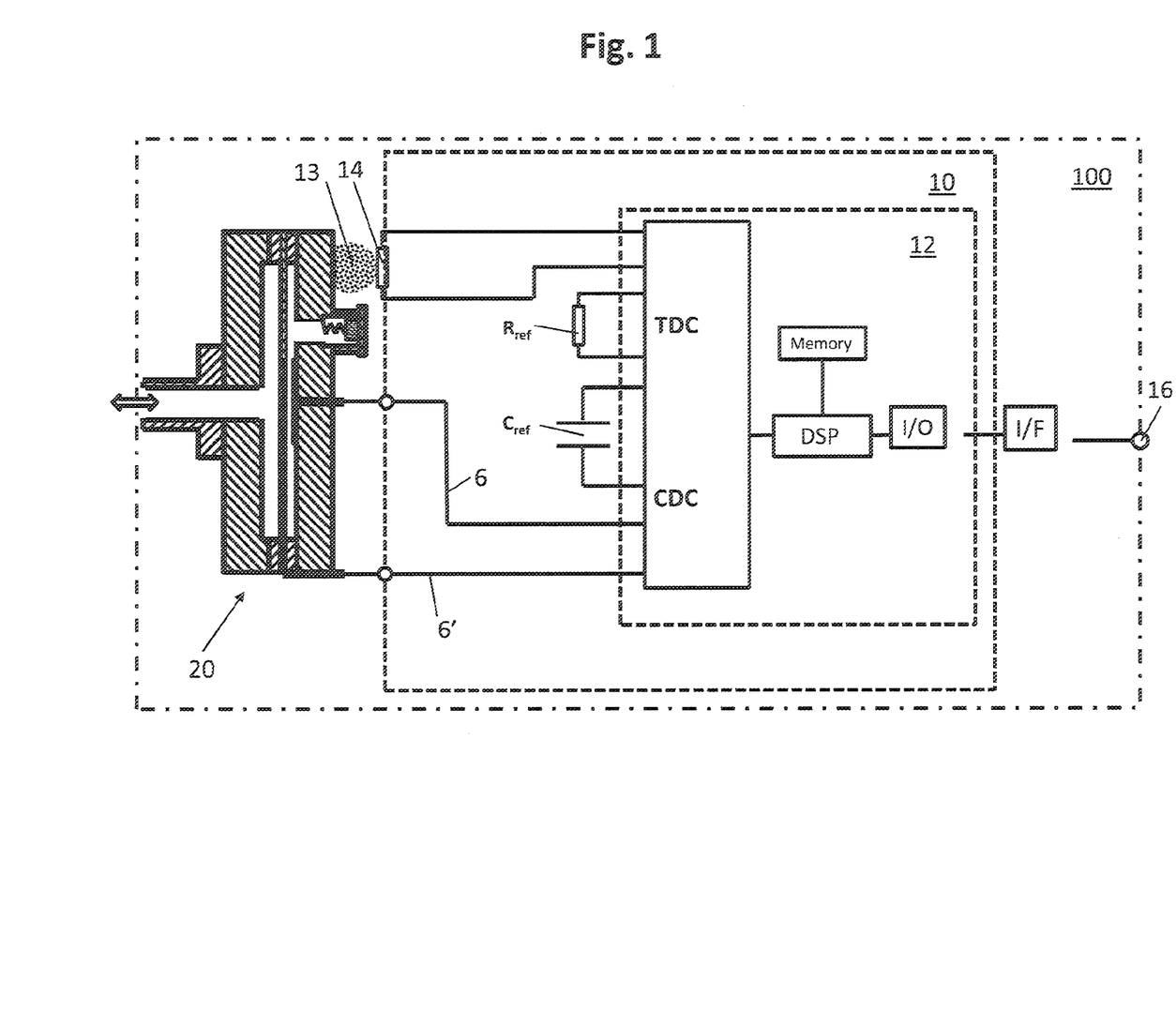
FIG. 1 schematically and in cross section, a measuring cell arrangement having a capacitive diaphragm pressure-measuring cell and an electronic circuitry for signal processing according to the invention, FIG. 2a schematically and in cross section, the capacitive diaphragm pressure-measuring cell in detail having the arrangement of the printed circuit board with the important electronic components arranged thereto, wherein an external temperature sensor is arranged thereto contacting thermally the diaphragm pressure-measuring cell, FIG. 2b schematically and in cross section, the capacitive diaphragm pressure-measuring cell in detail according to FIG. 2a, wherein the microchip as temperature sensor is arranged on the printed circuit board such that said temperature sensor thermally contacts the diaphragm pressure-measuring cell and wherein the reference capacitor is arranged at the bottom of the printed circuit board, FIG. 2c schematically and in cross section, the capacitive diaphragm pressure-measuring cell in detail according to FIG. 2a, wherein the microchip as temperature sensor is arranged on the printed circuit board such that said temperature sensor thermally contacts the diaphragm pressure-measuring cell and wherein the reference capacitor is arranged at the upper side of the printed circuit board, FIG. 3 schematically, a scheme for the circuitry of two measuring cell arrangements for signal processing in, e.g., synchronized operation, FIG. 4 schematically, a scheme for the operation of two measuring cell arrangements for signal processing according to FIG. 3 during the application for the pressure determination or calibration, respectively, according to the method of static expansion.

The basic structure of a measuring cell arrangement 100, according to the present invention, for the fast measuring of vacuum pressure allowing a high measuring speed, is schematically shown in FIG. 1.

The measuring cell arrangement 100 comprises a capacitive measuring cell arrangement 20 having all necessary electronic components 12, 14 for processing the pressure signal of the measuring cell arrangement 100, said measuring cell arrangement 100 being arranged in a special configuration in relation to the capacitive measuring cell arrangement 20, and thus allows providing a precise, corrected pressure signal with a high measuring velocity at an interface 16. Said measuring cell arrangement 100 is located inside a housing and forms a component, which can be arranged in known manner at vacuum lines and vacuum chambers for the measuring of vacuum pressure or gas pressure, respectively, in vacuum processes. The processed pressure signal, which now high-precisely equals the actual pressure to be measured, is transferred at the interface 16, e.g., via a plug connection, which is designed as interface I/F. Said signal can afterwards, for instance, be transferred to a signal processing unit 200, which converts the signal into another desired processable form dependent on the further processes to be processed, as shown, for instance, in FIG. 3. Said further processed signal can finally be transferred to a higher-level system for data processing 300.

During asynchronous operation, i.e., the measuring cell units provide the data about their own time and rate, the signal processing unit 200 allows the processing of the data such that they have a collective time stamp, which is generated by the real time clock. The data received in a parallel manner is converted by the signal processing unit into a suitable data file format for transferring the data in a sequential manner to the data processing system 300 afterwards, where the data is stored and evaluated. During synchronous operation, the measuring cell arrangements are triggered by the signal processing unit 200, so that the data collection can take place simultaneously. Moreover, the data processing unit enables the suitable data transfer to the computer, where the data can be stored and analyzed or evaluated, too.

It is important that the electronic components 12, 14 of the measuring cell arrangement 100 are positioned as close as possible to the diaphragm pressure-measuring cell 20, preferably directly behind, meaning opposite to the measuring opening 27. The short connecting paths allow low parasitic capacitance of the supply lines to the electronics assembly and a thermal linking to the housing 1, 4 of the diaphragm pressure-measuring cell 20. Thus, it is possible to be able to precisely collect first and evaluate the very small capacitances $C_x$ and capacitance changes of the capacitive diaphragm pressure-measuring cell 20 for the high resolution to be measured, wherein the thermal linking allows identifying the temperature behavior of the arrangement for further correction, but also guarantees the temperature synchronism of the participating components among themselves and with the measuring cell.

For this purpose, at least all active components are arranged at a single small printed circuit board 10, which is arranged directly next to or preferably behind the diaphragm pressure-measuring cell. The printed circuit board comprises electrical connectors 6, 6', which connect the capacitor electrodes 7, 7' of the diaphragm pressure-measuring cell 20 with a microchip 12 on the printed circuit board 10. A temperature sensor 14 can be provided on the printed circuit board 10 for measuring the temperature of the diaphragm pressure-measuring cell 20. Particularly suitable for such temperature sensors 14 are platinum resistors, such as the type Pt1000 or Pt100. In this case, the temperature sensor 14 together with the printed circuit board 10 are arranged such that said temperature sensor 14 touches the diaphragm pressure-measuring cell 20 and that a heat transfer zone 13 is formed for a good heat transfer. Additional heat transfer means, such as heat conductive pastes, silicone pads etc., can be arranged in this area. However, the microchip 12 itself is preferably used for the temperature measurement instead of the external temperature sensor 14, wherein the microchip 12 itself is then arranged in direct contact with the diaphragm pressure-measuring cell 20 for the temperature measurement. In this case, the external temperature sensor 14 having the connecting lines on the printed circuit board 10 is not needed, since temperature-sensitive components within the microchip 12 assume this task by appropriate programming of the software stored in the microchip. Thus, the accuracy of the temperature measurement, and therefore of the corrected pressure signal, can be increased further. Moreover, the arrangement is further simplified.

The microchip 12 comprises a CDC (capacitance-to-digital converter), which measures the pressure-dependent capacitance $C_x$ of the diaphragm pressure-measuring cell 20 according to the discharge-time measurement method and precisely converts said pressure-dependent capacitance $C_x$ into a digital signal for further processing within the microchip 12. Further, the microchip 12 comprises a TDC (temperature-to-digital converter), which precisely converts the measured temperature $T_x$ at the diaphragm pressure-measuring cell 20 into a digital signal for further processing within the microchip 12, wherein the temperature measurement is carried out by an external temperature sensor 14 or, preferably by the microchip 12 itself, which then serves as temperature sensor. The microchip comprises a DSP (digital signal processor) and a memory as data storage, too. The DSP processes the measured temperature signals and the capacitance signals according to a pre-set program, whereby said signals are processed according to the calibration data previously determined and under the usage of additional correcting algorithms into a precise pressure signal. Besides the correction following the principle of the own adaption of the capacitance measurement, a superimposed correction takes place according to the values for each single diaphragm pressure-measuring cell 20, specifically determined during a calibration process, for both temperature and the measured pressure-dependent capacitance. The software for the operation of the DSP and the calibration data of the diaphragm pressure-measuring cell 20 are stored in the memory. The communication with the outside is implemented by an input-output interface I/O. It is important that all these elements are arranged integrally at one single microchip 12. A reference resistor Ref and a reference capacitor $C_{ref}$ are additionally arranged at the printed circuit board 10, which are both connected with the microchip as directly as possible and serve the microchip 12 for the determination of the temperature values and the capacitance values of the diaphragm pressure-measuring cell 20. These two components need to be of high quality and have exact values and cannot be integrated on the microchip 12 itself. These two components need to be mounted carefully at the printed circuit board, too, to guarantee a good long-term stability being in particular particularly important for the reference capacitor $C_{ref}$. Thus, the desired fast measuring cycles can be achieved, also considering the complicated temperature behavior of the measuring cell arrangement 100, in particular of the capacitive diaphragm pressure-measuring cell 20, whereby simultaneously a precise pressure signal over the wide pressure ranges to be measured is enabled, which correlates correspondingly precise with the vacuum pressure to be measured.

Figure 2A:
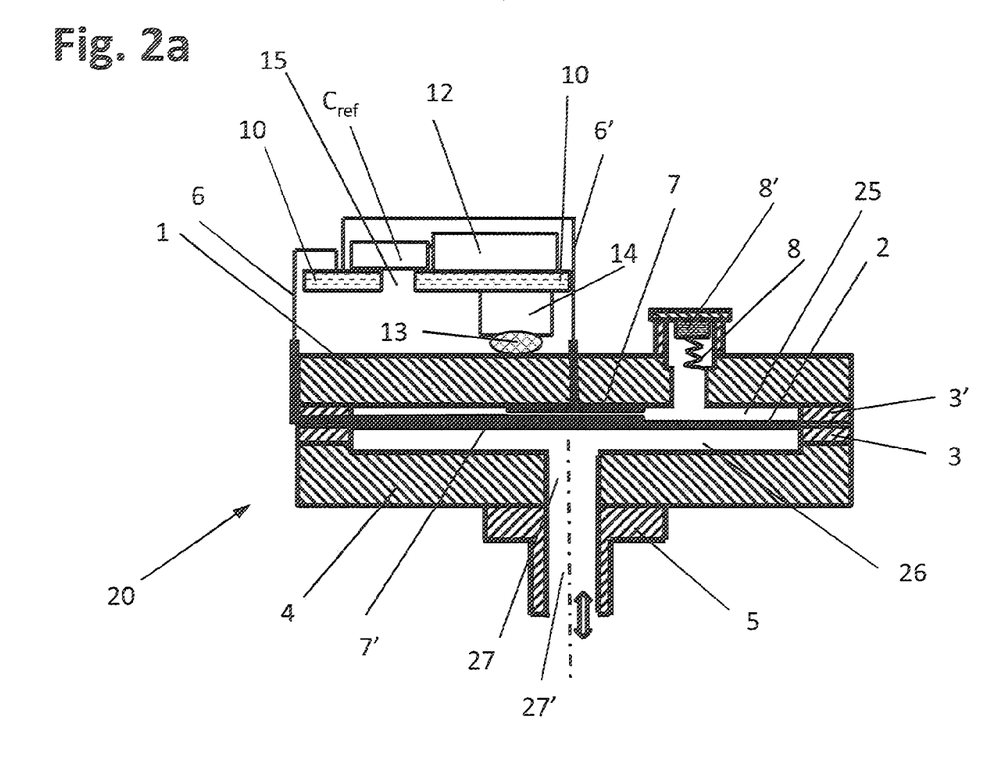
Figure 2B:
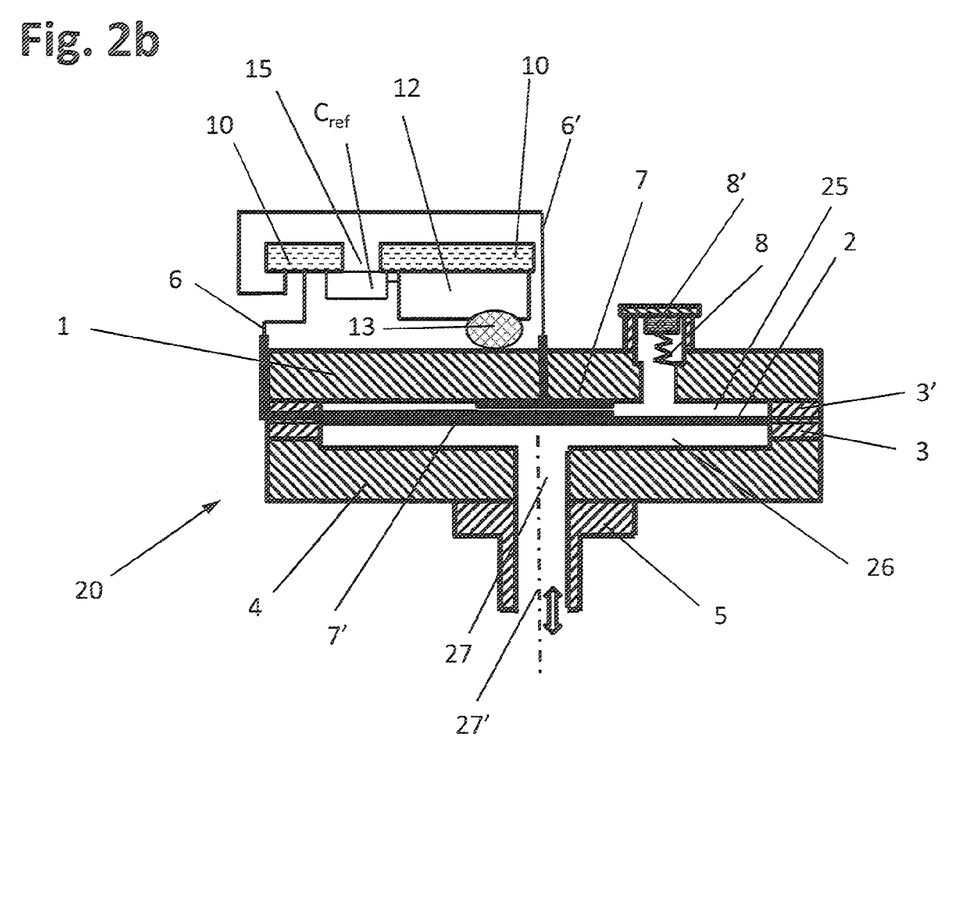
Figure 2C:
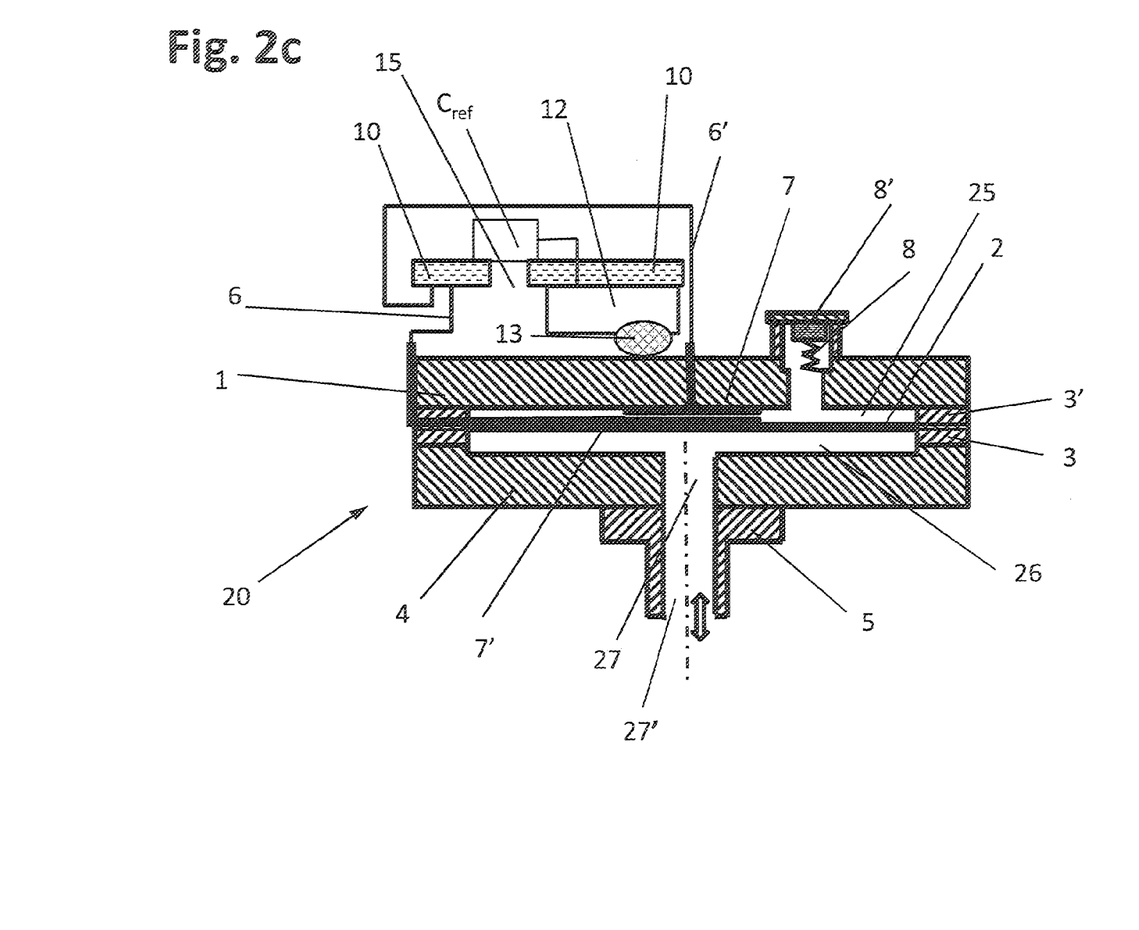

The FIGS. 2a to 2c show exemplarily, schematically and in cross section a preferred diaphragm pressure-measuring cell 20 in more detail, wherein different arrangements of the printed circuit board comprising the electronic components are shown.

A preferred capacitive diaphragm pressure-measuring cell 20 is constructed substantially completely symmetrically arranged around the diaphragm. The first housing body 1 is preferably designed plate-shaped and is arranged sealing up with a distance of 2 µm to 50 µm in relation to the diaphragm at the edge region. The space formed thereby encloses a reference vacuum space 25. The distance between the two areas is normally adjusted directly by the sealing material 3 during mounting or by a stepped edge formed at one or at both bodies and located between the diaphragm edge and the housing edge. In the same manner, a measuring vacuum space 26 is formed at the opposite diaphragm site using a second housing body 4, said measuring vacuum space 26 being accessible for the media to be measured by connecting means 5, 27 via a measuring opening 27 in the second housing body 4. The connecting means can be designed as nozzles 5 having a connecting line or as tube forming a measuring supply line 27' and are connected sealing up with the second housing body 4 via connecting means. The two housing bodies 1, 4 and the diaphragm 2 are preferably made of $Al_2O_3$. In order to maintain a long-term stable vacuum of high quality inside the reference vacuum space 25, a getter space 8 is advantageously arranged at the first housing body 1, said getter space 8 comprises a getter 8' and is connected with the reference vacuum space 25.

For a typical diaphragm pressure-measuring cell 20, for instance, having an outer diameter of 38 mm and a free diaphragm inner diameter of 30 mm, the distance 3 is approximately 2 to 50 µm, preferably 8 to 37 µm. In this connection, the first housing body 1 is, for instance, 5 mm thick and the second housing body 4 is, for instance, 5 mm thick. The second housing body 4 is preferably designed having a cavity, approximately 0.5 mm deep, preferably located in the interior at the periphery for the formation of a step to increase the measuring vacuum space 26. The diaphragm 2 and the housing 1 are coated with an electrically conductive layer 7, 7' each on the side facing the reference vacuum space for the formation of a capacitive diaphragm pressure-measuring cell 20. The two layers are not electrically connected with each other and form thereby the capacitor electrodes 7, 7' of the capacitor arrangement having the capacitance $C_x$. The electric connecting means of the conductive layers 7, 7' are preferably provided by vacuum-sealed, electrically conductive feedthroughs, preferably through the housing body 1, where said feedthroughs can be connected with the evaluation electronics, in particular with the microchip 12 on the printed circuit board 10.

In FIG. 2a, for example, a measuring cell arrangement 100 is shown having an external temperature sensor 14 being used as single component for the temperature measurement at the diaphragm pressure-measuring cell 20. In this connection, the temperature sensor 14 is arranged at the bottom of the printed circuit board and is connected with the diaphragm pressure-measuring cell 20. In the contact region the heat transfer zone 13 is located, where the direct heat transfer takes place. It is an advantage to position the temperature sensor 14 close to the microchip 12, preferably opposite. The temperature sensor 14, for instance, is positioned underneath the printed circuit board 10 and the microchip 12 is positioned above.

Additionally, it is shown in FIG. 2a how the reference capacitor $C_{ref}$ is arranged as close as possible to the microchip 12. In order to be able to maintain the capacitance value of said reference capacitor $C_{ref}$ as stable as possible and reproducible, even for long operating times, an opening 15 is advantageously designed at the printed circuit board 10, underneath said component, between the two connecting means. As a result, deposits and possible humidity variations are minimized there, which can have an unfavorable influence on the highly sensitive components. Said mounting arrangement is shown in the FIGS. 2a to 2c, wherein the reference capacitor $C_{ref}$ can be arranged both at the surface of the printed circuit board 12, as shown in FIGS. 2a and 2c, and at the bottom according to FIG. 2b.

A further arrangement, in which the microchip 12 itself simultaneously serves as temperature sensor, is shown in FIGS. 2b and 2c. In this case, the microchip 12 is arranged at the bottom of the printed circuit board 10 and is directly in thermal contact to the diaphragm pressure-measuring cell 20. As already mentioned, this is a preferred application, since this application delivers particularly good results.

According to an example of a particularly preferred method for measuring a vacuum pressure precise and fast, the method comprises a measuring cell arrangement 100 comprising a capacitive diaphragm pressure measuring cell 20 for measuring vacuum using a diaphragm 2 as a pressure transducer, wherein a first housing body 1 is arranged at one side of the diaphragm 2 spaced to the diaphragm sealing up at the edge region using a joining means 3' such that a reference vacuum space 25 is formed in between and that on the other side of the diaphragm 2 spaced to the diaphragm another housing body 4 is arranged sealing up at the edge region using a joining means 3 such that a measuring vacuum space 26 is formed in between and that the second housing body 4 comprises an opening 27 at which connecting means 5 are arranged sealing up using joining means for a communicating connection of the measuring vacuum space 26 with the medium to be measured, wherein inside the reference vacuum space 25 at least one part at least of the surface of the diaphragm 2 and located at the opposite at least one part at least of the surface of the first housing body 1 are designed electrically conductive and form capacitor electrodes 7, 7' for the formation of an electric capacitance $C_x$ and that the measuring cell arrangement 100 comprises a printed circuit board 10 which is equipped with electronic components 12, 14, $R_{ref}$, $C_{ref}$ and at least one of said electronic components acts as a temperature sensor, wherein the printed circuit board 10 is electrically connected with the capacitor electrodes 7, 7' of the diaphragm pressure-measuring cell 20. In this connection, the printed circuit board 10 is positioned relative to the diaphragm pressure-measuring cell 20 such that the component that acts as a temperature sensor thermally contacts the first housing body via a heat transfer zone 13 and that another electronic component is designed as microchip 12 containing a digital signal processor (DSP) with a temperature-to-digital converter (TDC) and a capacitance-to-digital converter (CDC), which operates using the time measuring method, said temperature-to-digital converter (TDC) and said capacitance-to-digital converter (CDC) determine the temperature $T_x$ and the capacitance $C_x$ of the diaphragm pressure-measuring cell 20 in comparison to a reference resistor Ref for the temperature being arranged at the printed circuit board and a reference capacitor $C_{ref}$ for the capacitance $C_x$ forming the measure for the pressure to be measured dependent on the deformation of the diaphragm 2, wherein a temperature-corrected pressure signal is derived from the two measured signals using correlation means, which have been determined in advance from a calibration process, and said temperature-corrected pressure signal is provided as a pressure signal $p=f(C_x, T_{eff})$ at the signal output 16 for further processing.

The following combinations can be used for the evaluation of the values determined via calibration for each diaphragm pressure measuring cell 20:

The values determined via calibration for the temperature correction and for the pressure signal can be stored as table in a memory (memory) within the microchip (12).

The values determined via calibration for the temperature correction and for the pressure signal can also be stored as mathematical function $T_{eff}=f(T_x)$ and $P_{eff}=f(C_x)$ in a memory (memory) within the microchip (12).

The values determined via calibration for the temperature correction can also be stored as table in a memory (memory) within the microchip (12) and the values determined via calibration for the pressure signal can also be stored as mathematical function $P_{eff}=f(C_x)$ in a memory (memory) within the microchip (12).

The values determined via calibration for the pressure signal can also be stored as table in a memory (memory) within the microchip (12) and the values determined via calibration for the temperature correction can also be stored as mathematical function $T_{eff}=f(T_x)$ in a memory (memory) within the microchip (12).

The pressure signal, derived from the measured capacitance $C_x$ of the diaphragm pressure-measuring cell 20, measured by the capacitance-to-digital converter (CDC), and from the measured temperature $T_x$, measured by the temperature-to-digital converter (TDC), is connected to the correlation means by a digital signal processor (DSP) within the same microchip 12 and is provided as a pressure signal at the signal output 16.

For each diaphragm pressure-measuring cell (20) the calibration values for the correction of the measured temperature values and for the determination of the pressure signal are separately determined and are read into the memory (memory) of the microchip 12.

The measurement period within the microchip 12 is adjusted to less than 8 ms, preferably less than 1 ms.

The signal quality of the determined pressure signals at the capacitance $C_x$ of the diaphragm pressure-measuring cell 20 and/or of the temperature signal $T_x$ can advantageously be further improved by processing these signals using an additional algorithm. In this connection, particularly the signal noise is advantageously treated. To minimize the signal noise, for instance, several single measurements are carried out during a measurement period and an average value derived from said several single measurements is determined. The average value is calculated by the DSP. Other methods for noise minimization can also be used besides averaging. The actual pressure measuring value is calculated based on this average value by the DSP using a suitable calculation rule. Said calculation rule describes the relationship between the measured capacitance value $C_x$ and the corresponding pressure value. Said relationship is, as described previously, temperature-dependent, too. To achieve a pressure measurement as precise as possible, the sensor temperature needs to be measured as well and needs to be taken into account for the correction of the measured pressure signal.

The temperature measurement is carried out, for instance, using a suitable temperature-sensitive sensor, such as, e.g., a Pt1000 resistor or another electric resistor. In this connection, the usage of the internal components of the microchip 12 themselves as temperature sensor is particularly preferred. The temperature signal measured by the temperature sensor 14 or by the microchip 12 is converted into a digital signal by the temperature-to-digital converter (TDC). The temperature is preferably measured within the same measurement period as the capacitance. Since the temperature changes less quickly in comparison to the pressure, the temperature signal can be processed more extensively, for instance, preferably filtered strongly.

Such a filter has a form such as:

$$R\_filtered(n+1)=k*(R\_filtered(n)+(1-k)*Rx.$$

By using k=0.99, the signal noise can be reduced to, e.g., less than 10 ppm (equals 0.001° C.), while the response time remains even lower than 1 s for a measuring time of 1 ms.

Another beneficial filter can be used as well. The filtering is carried out by the DSP according to a preset algorithm. The actual temperature is calculated based on said filtered temperature by the DSP using a calculation rule.

By usage of a Pt1000 temperature sensor, the relationship is, for example, the following:

$$T\_calculated\ [°\ C.]=a_3*R^3+a_2*R^2+a_1*R+a_0 \quad (1)$$

T_calculated being the temperature calculated based on the measuring values, R being the measured and filtered resistance and the coefficients being:
$a_3$=0.719405
$a_2$=7.542922
$a_1$=238.616231
$a_0$=−246.878394

The above mentioned parameters are used for measuring the raw data (1$^{st}$ step of the calibration), i.e., for at least three different temperatures $T_{actual}$ (e.g., 15° C., 30° C. and 45° C.) T_calculated is determined.

By means of a suitable mathematical fit method (adjustment calculation), such as a least square fit, a correction function of first or higher order is determined based on the calculated temperature values (T_calculated [° C.] and actual temperature). Said correction function describes the relationship between the actual and the measured temperature. A correction function of the following form arises from the usage of three different calibration temperatures:

$$T_{actual}=k_1*T\_calculated+k_0\ being \quad (2)$$

$T_{actual}$: searched temperature [° C.]
$k_1$: result of least square fit 1$^{st}$ order
$k_0$: result of least square fit 1$^{st}$ order
$k_1$ is equivalent to the gain or the amplification error of the measuring arrangement, respectively
$k_0$ is equivalent to the offset or the deviation error of the measuring arrangement, respectively Inserting (1) in (2) results in:

$$T\_actual=b_3*R^3+b_2*R^2+b_1*R+b_0\ being$$

$b_3=a_3*k_1$
$b_2=a_2*k_1$
$b_1=a_1*k_1$
$b_0=a_0*k_1+k_0$

In the final step, the values $a_3 \ldots a_0$ are replaced by the values $b_3 \ldots b_0$ and stored in the sensor.

In a similar manner, signal filter algorithms can be implemented for the improvement of the signal quality of the pressure measuring signal as well. The measured pressure signal and/or temperature signal is processed by at least one other algorithm within the microchip 12 using the digital signal processor (DSP) for increasing the measured signal quality and is correlated with the pressure signal for increasing the pressure signal quality, which is provided at the signal output 16, wherein preferably at least one of the algorithms is designed as signal filter algorithm. The filtered temperature signals are consequently correlated with or corrected by, respectively, the filtered pressure measuring signal, whereby, besides the calibration, which is carried out additionally, the pressure signal being provided at the output 16 of the measuring cell arrangement 100 comprises a further improved quality in regard to the accuracy.

Such algorithms can additionally be implemented due to the method according to the invention, since the arrangement of the components in the measuring cell arrangement 100 together with the defined setup of the microchip 12, according to the invention, allows a faster signal processing.

An algorithm for the reduction of the signal noise, e.g., as previously described, is particularly advantageous. Signal noise reduction causes a more stable signal output, since the data is, for example, averaged or filtered. Said signal noise reduction also allows obtaining useful measuring values even for a small signal-to-noise ratio or even for S/N<1 and therefore extends the measurement range. Not only the temperature signal, but also the capacitance pressure signals can advantageously be filtered. A quicker signal processing as enabled by the measures ing cell arrangement 100 together with the defined setup of the microchip 12, allows now also an extensive filtering and associated therewith also an extension of the measurement range or a better data quality, even in industrial surroundings showing more undesired interferences upon the sensors.

Figure 3:
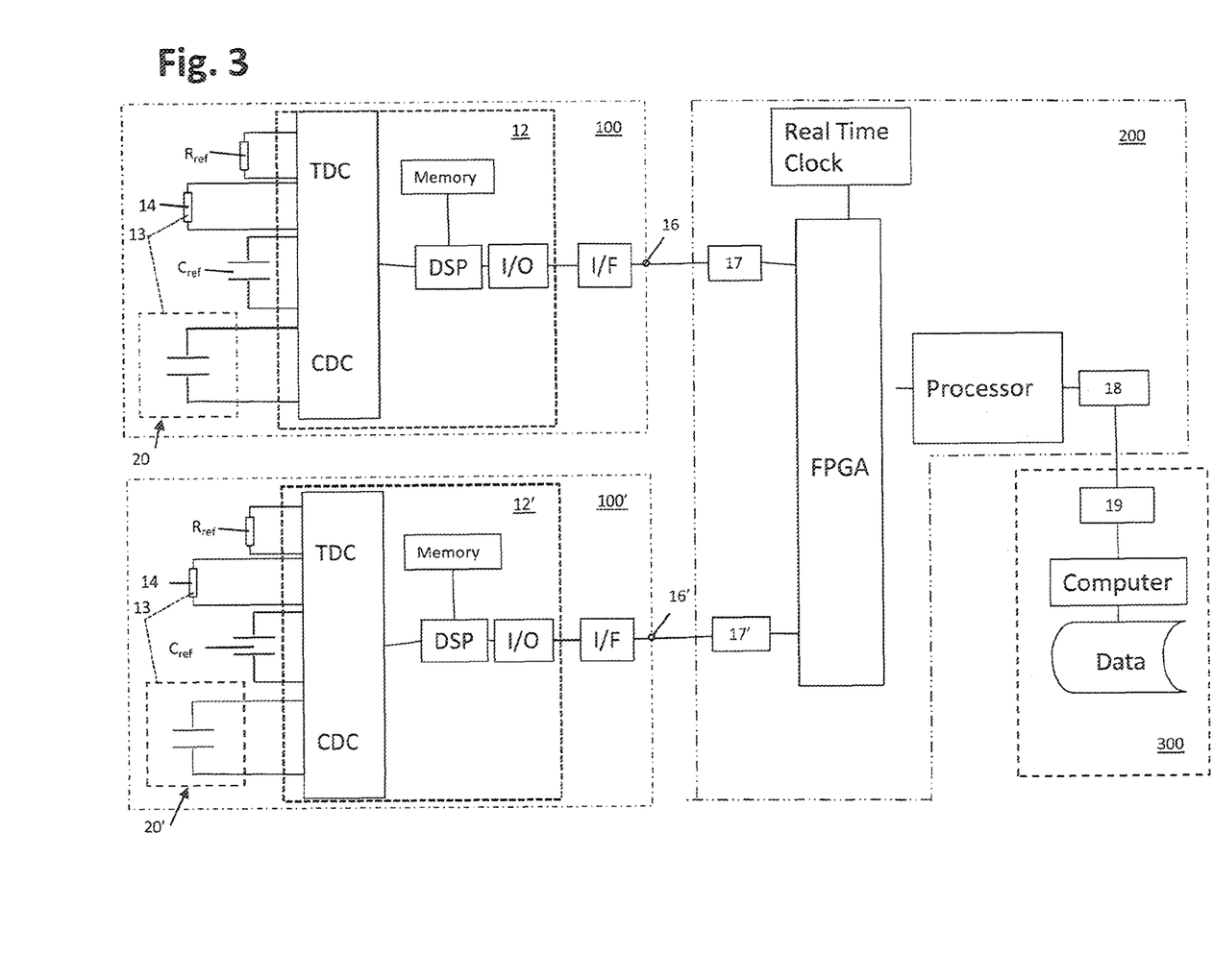

FIG. 3 schematically shows the circuitry of two measuring cell arrangements 100 for signal processing, e.g., with an as simultaneous as possible, synchronized operation for the acquisition of the pressure measurement by fast acquisition of the actual pressure conditions in the vacuum process. In this connection, the measuring cell arrangement 100 is used as reference measuring arrangement for the calibration of vacuum measuring cells, in particular according to the method of static expansion. The pressure signals of the two measuring cell arrangements 100 are forwarded from their signal outputs 16, 16' to the signal processing unit 200. Said signal processing unit 200 receives the pressure signals via the present interface 17, 17' and the pressure signals are processed using an FPGA (field programmable gate array), which is clocked by an real time clock, and a subsequent processor and are transferred via the interface 18. A unit for data processing 300 comprising an interface 19 and a computer, which carry out further data (data) evaluation, can be connected therewith.

The measuring cell arrangement 100 according to the invention is well suited for the calibration of other vacuum pressure-measuring cells, due to the high accuracy of the measurement, which can be achieved and even for a high velocity of the measuring process. In this connection, for the calibration method, the usage of measuring cells according to the method of static expansion is particularly suitable.

Figure 4:
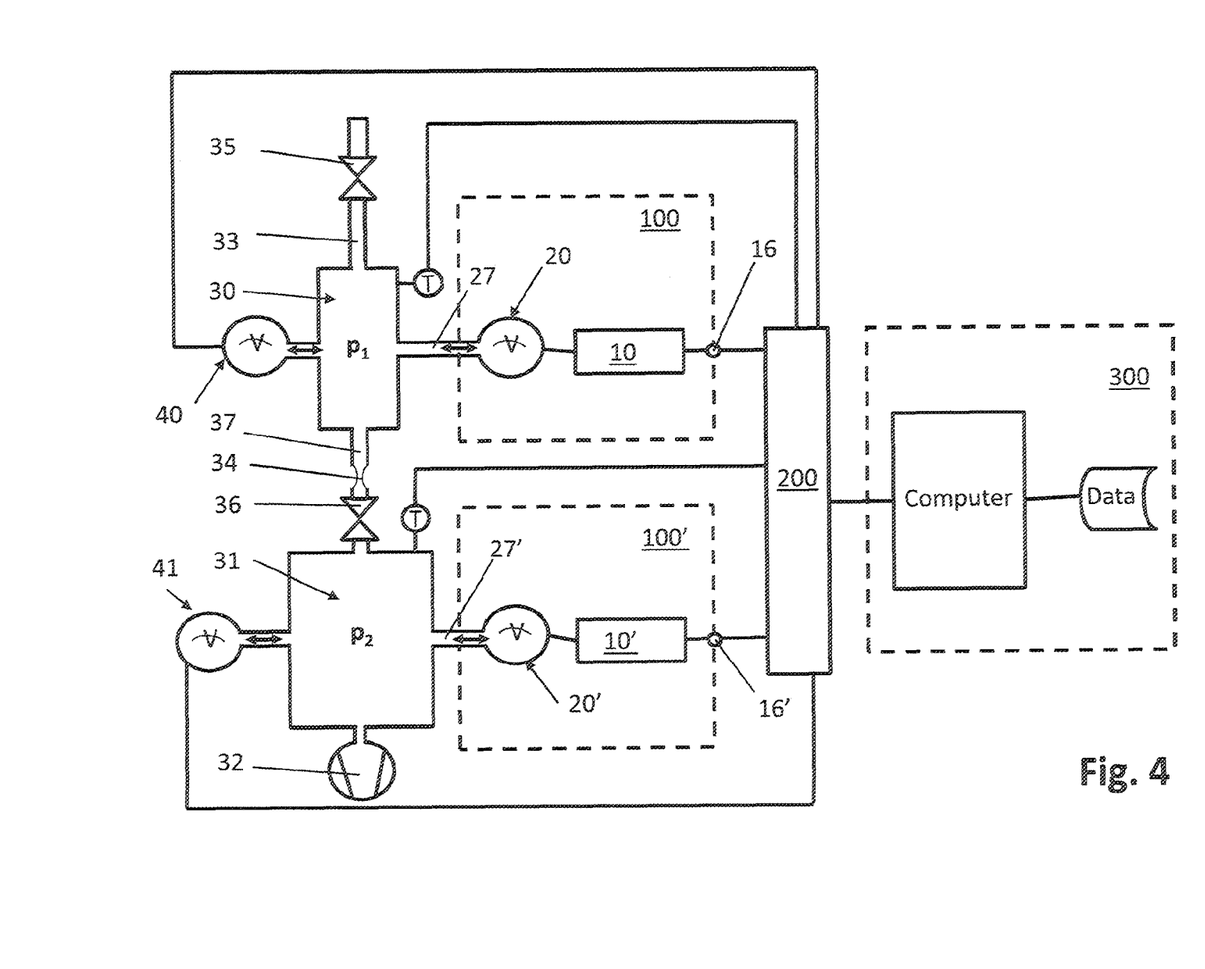

For the calibration method of measuring cells according to the method of static expansion, for example, according to the illustration shown in FIG. 4, two vacuum chambers 30, 31 are used, wherein the second vacuum chamber 31 is evacuated by a vacuum pump 32. Said vacuum chambers 30, 31 are connected to each other via a second line 37 having an intermediately connected aperture 34 and a second valve 36. The first vacuum chamber 30 is connected via a first line 33 with a first valve 35 to the gas supply or to the atmosphere, respectively. At each vacuum chamber 30, 31 a measuring cell arrangement 20, 20' on its own is arranged as reference measuring arrangement, wherein said reference measuring arrangements can preferably be operated time-synchronized with a signal processing unit 200, or as time-synchronous as possible due to the fast measuring periods being possible now. The measuring cells to be measured can be arranged each as measuring cell test items 40, 41 at the vacuum chambers 30, 31.

A further particularly advantageous application is the usage of the measuring cell arrangement 100 according to the invention in a gas pressure control system for the precise control and adjustment of the gas pressure in a vacuum process system. This allows, due to the quick and precise measurement, a very precise process control of the vacuum processes.

The invention claimed is:
1. A method for vacuum pressure measurement using a measuring cell arrangement (100) comprising:
providing a measuring cell arrangement (100), the measuring cell arrangement (100) comprising:
a capacitive diaphragm pressure-measuring cell (20) for measuring a vacuum medium and comprising a diaphragm (2) as a pressure transducer,
a first housing body (1) is arranged at a first side of the diaphragm (2) spaced apart from the diaphragm and sealed at an edge region thereof using a joining means (3') such that a reference vacuum space (25) is formed in between the first housing body (1) and the diaphragm (2);
a second side of the diaphragm (2) opposite the first side of the diaphragm (2) spaced apart from a second housing body (4) and sealed at an edge region thereof using a joining means (3) such that a measuring vacuum space (26) is formed in between the second housing body (4) and the diaphragm (2),
the second housing body (4) comprising an opening (27) at which connecting means (5) are arranged for a communicating connection of the measuring vacuum space (26) with the vacuum medium to be measured,
wherein inside the reference vacuum space (25) at least part of the surface of the diaphragm (2) and at least part of a surface of the first housing body (1) are electrically conductive and form respective capacitor electrodes (7, 7') for the formation of an electric capacitance ($C_x$);
a printed circuit board (10) which is equipped with electronic components (12, 14, $R_{ref}$, $C_{ref}$) wherein at least one of said electronic components acts as a temperature sensor,
wherein the printed circuit board (10) is electrically connected with the capacitor electrodes (7, 7') of the diaphragm pressure-measuring cell (20),
wherein the printed circuit board (10) is positioned relative to the diaphragm pressure-measuring cell (20) such that the component that acts as a temperature sensor thermally contacts the first housing body,
a microchip (12) containing a digital signal processor (DSP) with a temperature-to-digital converter (TDC) and a capacitance-to-digital converter (CDC) which operates using a time measuring method, said temperature-to-digital converter (TDC) and said capacitance-to-digital converter (CDC) being configured to determine a temperature ($T_x$) and the capacitance ($C_x$) of the diaphragm pressure-measuring cell (20) in comparison to a reference resistor ($R_{ref}$) for the temperature being arranged at the printed circuit board and in comparison to a reference capacitor ($C_{ref}$) for the capacitance ($C_x$) forming the measure for the pressure to be measured dependent on the deformation of the diaphragm (2),
correlation means comprising stored relationships determined and saved in advance through a calibration process, and configured to derive a temperature-corrected pressure signal as a pressure signal p=f($C_x$, $T_{eff}$) at the signal output (16);

the method further comprising:
connecting the vacuum medium to be measured to the connecting means (5), the vacuum medium then being fluidically linked to the measuring vacuum space (26) and contacting the diaphragm;
measuring the electric capacitance ($C_x$) of the capacitor electrodes (7, 7');
measuring a temperature using the temperature sensor; and
deriving a temperature-corrected pressure signal $p=f(C_x, T_{\mathit{eff}})$.

2. The method according to claim 1, characterized in that the values determined for the temperature correction and for the pressure signal via calibration are stored as a table in a memory (memory) within the microchip (12);
the method comprising retrieving at least one of said stored values from the memory.

3. The method according to claim 1, characterized in that the values determined for the temperature correction and for the pressure signal via calibration are stored as mathematical function $T_{\mathit{eff}}=f(T_x)$ and $P_{\mathit{eff}}=f(C_x)$ in a memory (memory) within the microchip (12).

4. The method according to claim 1, characterized in that values determined for the temperature correction via calibration are stored as a table in a memory (memory) within the microchip (12) and the values determined for the pressure signal are stored as a mathematical functions $T_{\mathit{eff}}=f(T_x)$ and $P_{\mathit{eff}}=f(C_x)$ in the memory (memory) within the microchip (12);
the method comprising retrieving at least one of said stored values from the memory.

5. The method according to claim 1, characterized in that the values determined for the pressure signals via calibration are stored as a table in a memory (memory) within the microchip (12) and the values determined for the temperature correction via calibration are stored as a mathematical function $T_{\mathit{eff}}=f(T_x)$ in the memory (memory) within the microchip (12).

6. The method according to claim 1, comprising:
deriving the pressure signal from
(1) the measured capacitance ($C_x$) of the diaphragm pressure-measuring cell (20), said capacitance being quantified by the capacitance-to-digital converter (CDC), and from
(2) the measured temperature ($T_x$), said temperature being quantified by the temperature-to-digital converter (TDC),
wherein the capacitance-to-digital converter (CDC), the temperature-to-digital converter (TDC), a digital signal processor (DSP), and a memory holding stored relationships of the correlation means, are all provided on the microchip (12).

7. The method according to claim 1, characterized in that for each diaphragm pressure-measuring cell (20) calibration values for the correction of the measured temperature values and for the determination of the pressure signal are separately determined and are stored on the memory (memory) of the microchip (12).

8. The method according to claim 1, characterized in that a resistor element is used for the temperature sensor.

9. The method according to claim 1, characterized in that the microchip comprises the temperature sensor and thermally contacts the diaphragm pressure-measuring cell (20) via a heat transfer zone (13), the method comprising sensing the temperature using the temperature sensor.

10. The method according to claim 1, characterized in that a cavity is provided on the printed circuit board above which the reference capacitor ($C_{\mathit{ref}}$) is installed such that the reference capacitor ($C_{\mathit{ref}}$) contacts the printed circuit board only at connecting ends.

11. The method according to claim 1, wherein a measurement period of the microchip (12) is less than 8 milliseconds.

12. The method according to claim 1,
wherein at least one of the first housing body (1) and the diaphragm (2) comprises a dielectric material, and
wherein the first housing body (1) and the diaphragm (2) provide capacitor electrodes (7, 7') on opposed surfaces, said capacitor electrodes each being provided as one or more electrically conductive layers.

13. The method according to claim 1, wherein at least one of the first housing body (1), the diaphragm (2), and the second housing body (4) comprise dielectric aluminum oxide ceramic.

14. The method according to claim 1,
the method comprising processing at least one of a pressure signal and a temperature signal with a signal filter algorithm.

15. The method according to claim 1,
the method comprising using the measuring cell arrangement (100) as a reference measuring cell for calibrating one or more other measuring cells.

16. The method according to claim 1,
the method comprising using two measuring cell arrangements (100) as reference measuring cell for calibrating other measuring cells;
wherein two vacuum chambers (30,31) are provided and connected to each other by an aperture (34) and a valve (36); and
wherein each vacuum chamber (30,31) is connected to a respective measuring cell arrangement (100) which is used as a respective reference measuring cell.

17. The method according to claim 1, characterized in that the measuring cell arrangement (100) is used in a gas pressure control system;
the method comprising adjusting a gas pressure using the gas pressure control system, and determining a temperature-corrected pressure signal for the gas pressure using the measuring cell arrangement (100).

18. A measuring cell arrangement (100) comprising:
a capacitive diaphragm pressure: measuring cell (20) for measuring a vacuum medium using a diaphragm (2) as a pressure transducer,
wherein a first housing body (1) is arranged opposite a first side of the diaphragm (2) spaced apart from the diaphragm and sealed at an edge region thereof using a joining means (3') such that a reference vacuum space (25) is formed in between the first housing body (1) and the diaphragm (2); and
a second side of the diaphragm (2) opposite the first side of the diaphragm (2) spaced apart from a second housing body (4) and sealed at an edge region thereof using a joining means (3) such that a measuring vacuum space (26) is formed in between the second housing body (4) and the diaphragm (2), and
the second housing body (4) comprises an opening (27) at which connecting means (5) are arranged for a communicating connection of the measuring vacuum space (26) with the vacuum medium to be measured,
wherein inside the reference vacuum space (25) at least part of the first side of the diaphragm (2) and at least part of a surface of the first housing body (1) are electrically conductive and form respective capacitor electrodes (7, 7') for the formation of an electric capacitance ($C_x$); and wherein the measuring cell arrangement (100) comprises a printed circuit board (10) which is equipped with electronic components (12, 14, $R_{ref}$, $C_{ref}$) and at least one of said electronic components acts as a temperature sensor, wherein the printed circuit board (10) is electrically connected with the capacitor electrodes (7, 7') of the diaphragm pressure-measuring cell (20), characterized in that the printed circuit board (10) is positioned relative to the diaphragm pressure-measuring cell (20) such that the component that acts as a temperature sensor thermally contacts the first housing body via a heat transfer zone (13), and another electronic component is designed as microchip (12) containing a digital signal processor (DSP) with a temperature-to-digital converter (TDC) and a capacitance-to-digital converter (CDC), which operates using a time measuring method, said temperature-to-digital converter (TDC) and said capacitance-to-digital converter (CDC) being configured to determine the temperature ($T_x$) and the capacitance ($C_x$) of the diaphragm pressure-measuring cell (20) in comparison to a reference resistor ($R_{ref}$) for the temperature being arranged at the printed circuit board and to a reference capacitor ($C_{ref}$) for the capacitance ($C_x$) forming the measure for the pressure to be measured dependent on the deformation of the diaphragm (2), wherein a temperature-corrected pressure signal is derived from measured signals using correlation means, which have been determined in advance from a calibration process, and configured for providing said temperature-corrected pressure signal as a pressure signal $p=f(C_x, T_{eff})$ at the signal output (16) for further processing.

19. The measuring cell arrangement (100) according to claim 18, characterized in that the pressure signal, derived from the measured capacitance ($C_x$) of the diaphragm pressure-measuring cell (20), measured by the capacitance-to-digital converter (CDC), and from the measured temperature ($T_x$), measured by the temperature-to-digital converter (TDC), is connected to the correlation means by a digital signal processor (DSP) within the same microchip (12) and is provided as a pressure signal at the signal output (16).

20. The measuring cell arrangement (100) according to claim 18, characterized in that for each diaphragm pressure-measuring cell (20) calibration values for the correction of the measured temperature values and for the determination of the pressure signal are separately determined and are stored on a memory of the microchip (12).

* * * * *